(12) United States Patent
Schmid

(10) Patent No.: US 6,179,620 B1
(45) Date of Patent: Jan. 30, 2001

(54) FIREFIGHTER TRAINING BUILDING MODEL

(76) Inventor: Bernd Schmid, Schwanenstrasse 7, Frankfurt am Main D-60314 (DE)

(*) Notice: Under 35 U.S.C. 154(b), the term of this patent shall be extended for 0 days.

(21) Appl. No.: 09/306,430

(22) Filed: May 6, 1999

(30) Foreign Application Priority Data

May 8, 1998 (DE) ......................................... 298 08 347 U

(51) Int. Cl.[7] ................................................ G09B 19/00
(52) U.S. Cl. ........................................................... 434/226
(58) Field of Search ............................................. 434/226

(56) References Cited

U.S. PATENT DOCUMENTS

| 4,526,548 | * | 7/1985 | Livingston | 434/226 |
| 5,203,707 | * | 4/1993 | Musto et al. | 434/226 |
| 5,226,818 | * | 7/1993 | Feiock et al. | 434/226 |
| 5,316,484 | * | 5/1994 | Layton et al. | 434/226 |
| 5,518,403 | * | 5/1996 | Luftig et al. | 434/226 |
| 5,927,990 | * | 7/1999 | Welch et al. | 434/226 |

FOREIGN PATENT DOCUMENTS 402 473    5/1966 (CH).

* cited by examiner

*Primary Examiner*—Sam Rimell
*Assistant Examiner*—Bena B. Miller
(74) *Attorney, Agent, or Firm*—Larson & Taylor, PLC

(57) ABSTRACT

A building model on a miniature scale is used for simulating the smoke propagation in case of fires in buildings. For cost-effective and graphic training, the building model has several chambers which are connected by means of closable doors with a central chamber. The central chamber has an access opening from the ventilator for generating pressure differences and/or air currents in the building model are provided. A transparent plate permits viewing the interior of the building model and the smoke propagation taking place in the course of the simulation.

12 Claims, 4 Drawing Sheets

FIREFIGHTER TRAINING BUILDING MODEL

FIELD OF THE INVENTION

The invention relates to a building model for simulating the propagation of smoke from fires in buildings.

BACKGROUND OF THE INVENTION

When a fire actually breaks out in a building with a plurality of rooms, which are connected with each other via corridors or staircases, a very grave danger arises not only from the fire itself, but also from the smoke, which rapidly spreads through the building. In this case the propagation of the smoke for one is a function of the structure of the building, but also of further causes, for example open doors and windows, or the effect of ventilating installations.

In order to obtain the greatest possible fire protection, it is already required in the planning phase for buildings to take suitable counter-measures for restricting the smoke propagation. Tests performed in existing buildings are very expensive in time and costs, so that the experience used in planning of buildings mostly is the result of actual catastrophic fires.

With the deployment of the fire department in case of a fire it is also of extreme importance to have knowledge regarding the propagation of smoke, in particular as to the effects of measures which have been taken, for example the breaking of windows or the airing, or respectively ventilation of areas of the building. Here, too, the actions of the fire department are based on the experiences gathered in previous fires, since realistic training, for example in high-rise buildings, can hardly be performed.

Up to now, only training installations of actual room size are known from U.S. Pat. No. 5,226,818 and U.S. Pat. No. 5,203,707. However, the immense expenses of such installations appear to make them unsuitable for training purposes on a broad basis. The building model known from CH 402 473 is only used for illustration and has no fire-specific functions at all.

SUMMARY OF THE INVENTION

It is the object of the invention to create a building model by means of which it is possible to simulate the propagation of smoke in case of fires in buildings.

This object is attained in accordance with the invention in that the building model has several chambers, at least part of which are in contact with a central chamber by means of doors which can be closed, at least one steam-fog generator or smoke generator in a chamber, and at least one variably positionable miniature ventilator for generating pressure differences and air currents in the building model, wherein at least one lateral or the top cover plate of the model are transparent, and at least a portion of the chambers has windows, which can be closed.

It is possible with the aid of such a model to investigate the smoke propagation in a building under various effects, for example open windows and doors, as well as airing or draw-off measures. The doors and windows, as well as the arrangement of the miniature ventilator can also be affected during the simulation, for example for determining which course of action would make the most sense in fighting the fire. The transparent cover plate permits a view into the entire building from various perspectives, so that the building model is also suitable for the purpose of training large groups.

For example, it is possible with the aid of the building model in accordance with the invention to demonstrate that, in case of a source of fire in a room of a building (in the chamber of the building model), it would be advantageous to create an overpressure in the staircase, or respectively the corridor (central chamber) with the aid of a blower, instead of removing the air from there by suction.

In a first variation, the building model can be designed as a low building with a central chamber representing a corridor with chambers arranged around the latter. Preferably one ventilation flap is provided here in the upper cover plate in at least one chamber in order to simulate the ventilating properties of industrial flat-roofed buildings in particular.

For observing the smoke propagation in high-rise buildings, the central chamber can represent the model of a staircase, and the chambers can be arranged on several floors. Mixed shapes of the above mentioned alternatives of the invention are of course also possible, wherein several chambers of each "floor" are arranged around the central chamber representing the staircase.

Heat sources, for example electric heating devices or tea lights, are preferably arranged in the area of the fog, or respectively steam generators. With the aid of the heat sources it is possible to simulate the smoke propagation with even greater reality, since the fog and steam generators known from modeling operate at comparatively low temperatures, while in actuality smoke has a very high temperature and therefore rises, in contrast to cold smoke. The arrangement of heat sources in the vicinity of the fog, smoke or steam generators therefore permits the simulation of rising air currents.

If this is desired, it is possible to provide guide elements above the heat source for the specific deflection of the warm air current.

Since heat sources can destroy the generated fog or steam, the employment of ventilators is possible as an alternative, particularly in the area of the staircase, in order to be able to simulate the rising air currents without negatively affecting the quality of the steam, or respectively the fog. Moreover, the building model can have airing and ventilating installations, which simulate the air currents created in real buildings by air conditioning and ventilating installations.

In an advantageous further embodiment of the invention it is provided that the windows and doors can be actuated from the outside. It is possible to change the spatial conditions during the smoke generation with the aid of the actuating mechanisms, which for example are designed as a system of rods, in order to simulate an fire-fighting action by the fire department, for example, in which the doors are opened. In the spirit of the training of firemen close to actual conditions, it is also advantageous if the windows are made of an easily destroyed foil. In this case it is necessary to consider during a simulated operation whether a window is to be broken, or whether this should be avoided because of the creation of detrimental air currents.

A ventilator is advantageously arranged at the entry opening of the central chamber of the model. It is preferably reversible and provided with an aspirating tube on its suction side. By means of this it is possible to provide the removal of air from the central chamber by suction, as well as the buildup of an overpressure in the latter. Further ventilators can of course be arranged in the chambers of in the central chamber in order to be able to generate air currents close to actuality in areas of complex building models which are remote from the entry opening. The arrangement of oppositely acting ventilators next to each other for creating recirculating air currents is also conceivable.

Preferably a lateral wall, or respectively the transparent cover plate of the building can be removed, flipped open or pushed out of the way for making rearrangements or repairs in the chambers of the building model easier.

BRIEF DESCRIPTION OF THE DRAWINGS

Exemplary embodiments of the invention will be examined in detail in what follows by means of the attached drawings. Shown are in.

DETAILED DESCRIPTION OF THE PREFERRED EMBODIMENTS

Figure 1:
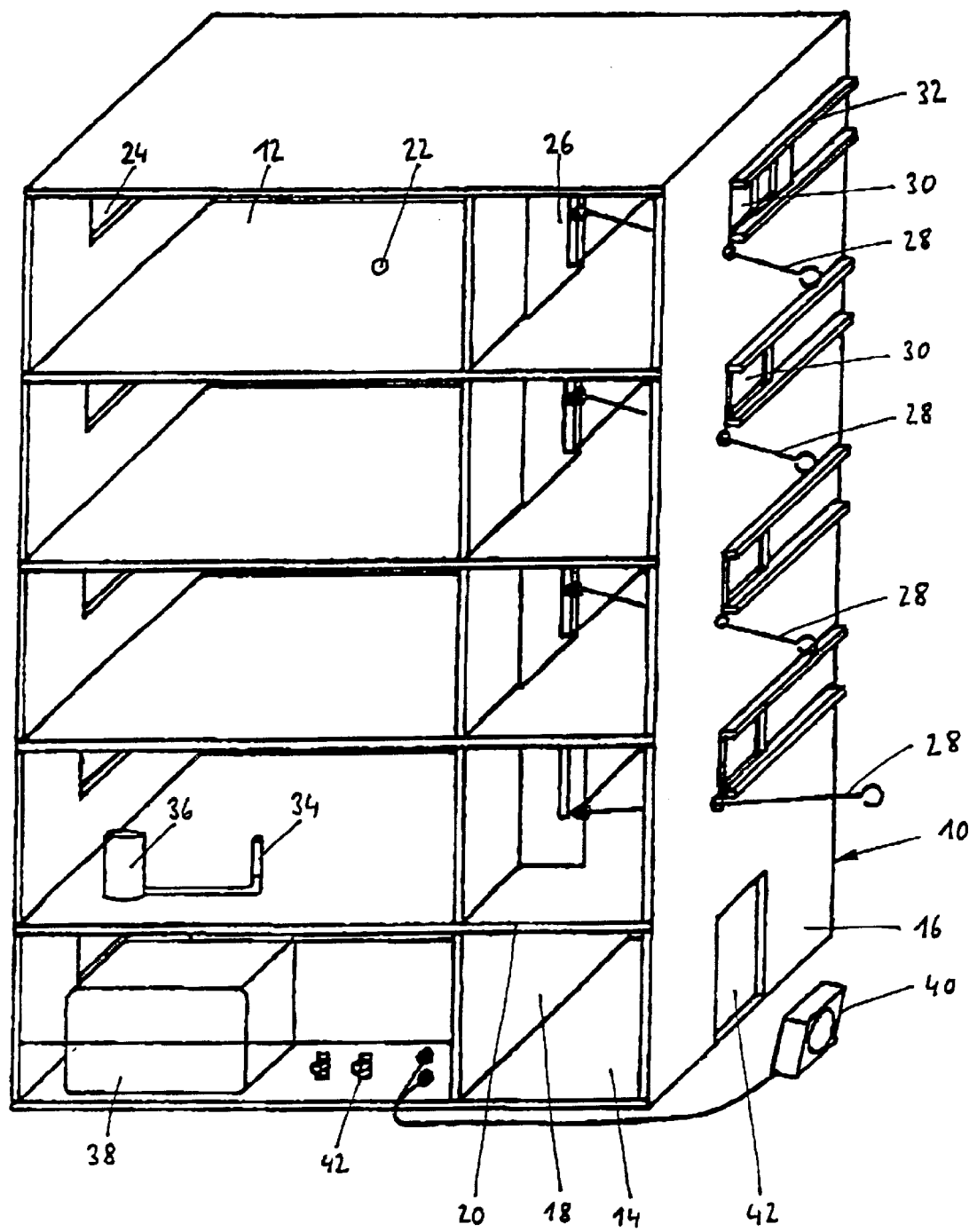
FIG. 1, a plan view of a building model with chambers arranged above each other.

FIG. 1 represents a building model 10 having several floors, arranged one above the other, with separate chambers 12 and a central chamber 14, which extends over all floors and in the model represents the staircase of a building. The lateral exterior walls 16, interior walls 18 and ceilings 20 of the building model 10 are made of wood or stamped-out sheet metal elements, while the front and rear walls consist of glass or plexiglass panels in order to permit a visual examination of the interior of the building model 10. At least one front face of the building model 10 can be removed, tilted away or laterally pushed away.

The individual chambers 12 have window openings 24, closeable toward the exterior, as well as doors 26, actuable toward the central chamber 14. Each of the doors 26 has an actuating rod 28, which projects out of the building model 10 and therefore makes the actuation of the doors 26 possible when the cover plate is closed. The door 26 on the first floor of the model 10 is shown open in FIG. 1. The central chamber 14 also has an actuable window 30 on each floor, which is movably seated in sliding guides 32.

A steam generator 34 with a reservoir 36 is provided in the chamber 12 on the first floor. Such steam generators are known, for example, from modeling and are electrically operated.

A transformer 38 is provided in the chamber 12 of the "ground floor", which can be connected to the conventional current supply of a household and supplies the electric consumers in the building model 10. Besides the steam generator 34, a miniature ventilator 40 is also connected to the transformer 38 via a switch 42. By means of the ventilator it is possible to create air currents in the building model 10, or overpressure in the central chamber 14 or in the individual chambers 12. The ventilator 40 can be arranged at various locations inside the building 10. In accordance with FIG. 1 it is arranged in such a way that it can blow air through an access opening 42 to the central chamber 14 and can thereby generate an overpressure in the central chamber 14.

The transformer 38 can supply further electrical consumers in the building model 10, for example lighting fixtures, electrical heating devices in the area of the steam generator 34 or photoelectric barriers, which act as smoke detectors. A heating device in the vicinity of the steam generator 34 makes it possible to generate warm air flows which closely resemble actual ones, and which cannot be created by means of the steam generator 34 alone, which is known from modeling and operates at low temperatures.

Figure 2:
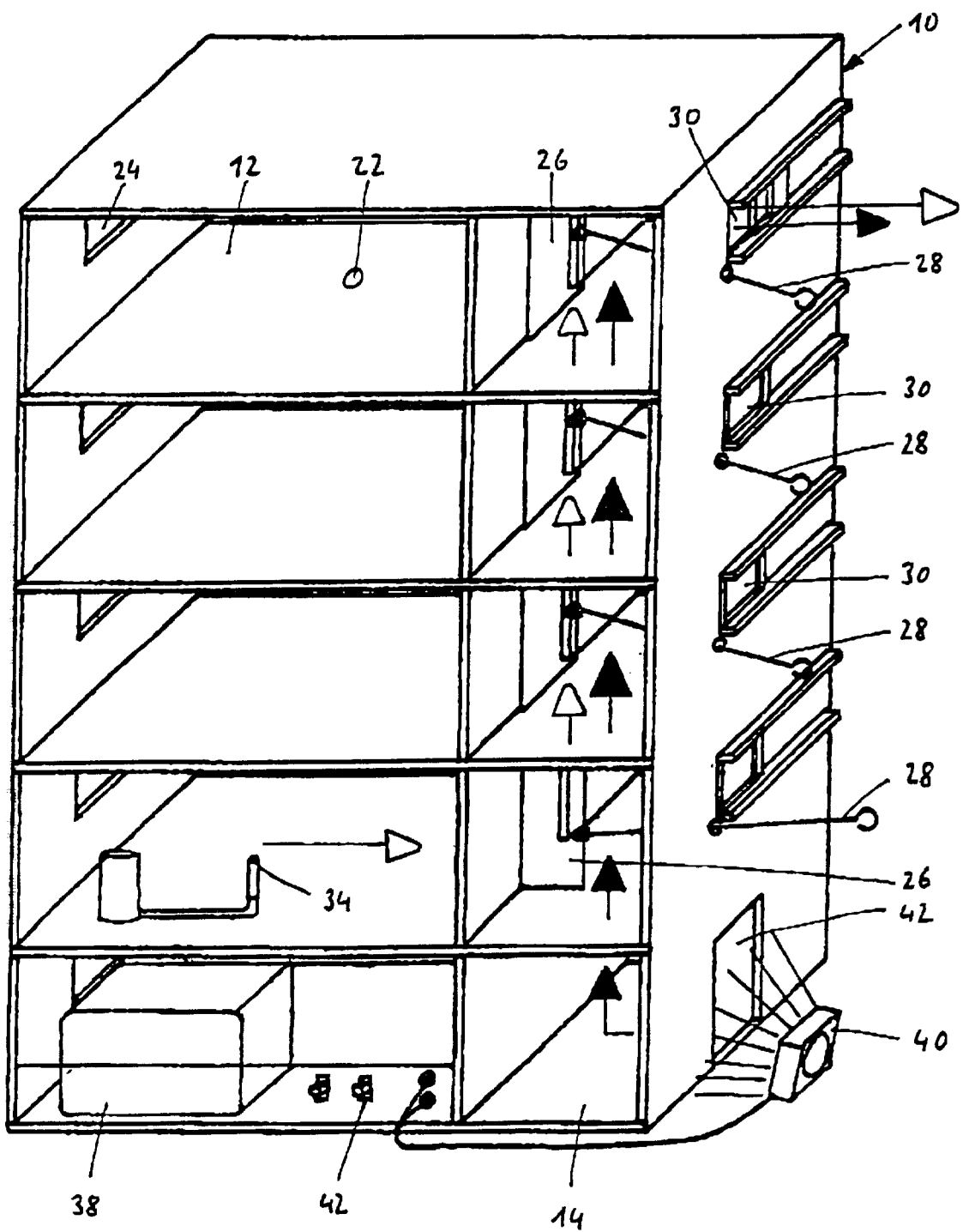
FIG. 2, the building model of FIG. 1 with simulated smoke propagation.

The building model 10 is represented in FIG. 2 with the steam generator 34 turned on and with the ventilator 40 operating. The steam, which is heated by a suitable heating device (not represented), from the steam generator 34 rises upward and reaches the central chamber 14 through the open connecting door of the chamber 12, in which the steam generator 34 is arranged. The steam can escape through an open window 30 in the top floor. The ventilator 40 provides an air current from the bottom to the top in the central chamber 14. It is possible to determine from such a test by means of the model that in actuality an action of the fire department could take place through the staircase since, because of the air currents, it is free of smoke on the ground floor and to the larger part also on the first floor.

The oil supply for the steam generator 34 from the reservoir can be provided with the aid of gravity, or of a pump with a metered feed amount or in that the steam generator sits in the oil.

It is of course easily conceivable to arrange several chambers on one floor, which are connected by means of separate doors with the central chamber 14. Although basically all layouts known in actuality are conceivable, consideration should be given to the fact that clarity will suffer with an overly complex interior structure of the building model 10.

The door openings of the interior doors 26 can be made of various widths, so that, for example in case of a simulation of a fire in an old building, large door openings are provided, and with a simulation of a fire in a modern high-rise building narrow door openings.

To come closer to actuality it is also possible for the chambers 12 to be lined with porous materials, which absorb smoke in the course of the smoke generation and subsequently slowly give it off again into the surroundings.

Figure 3:
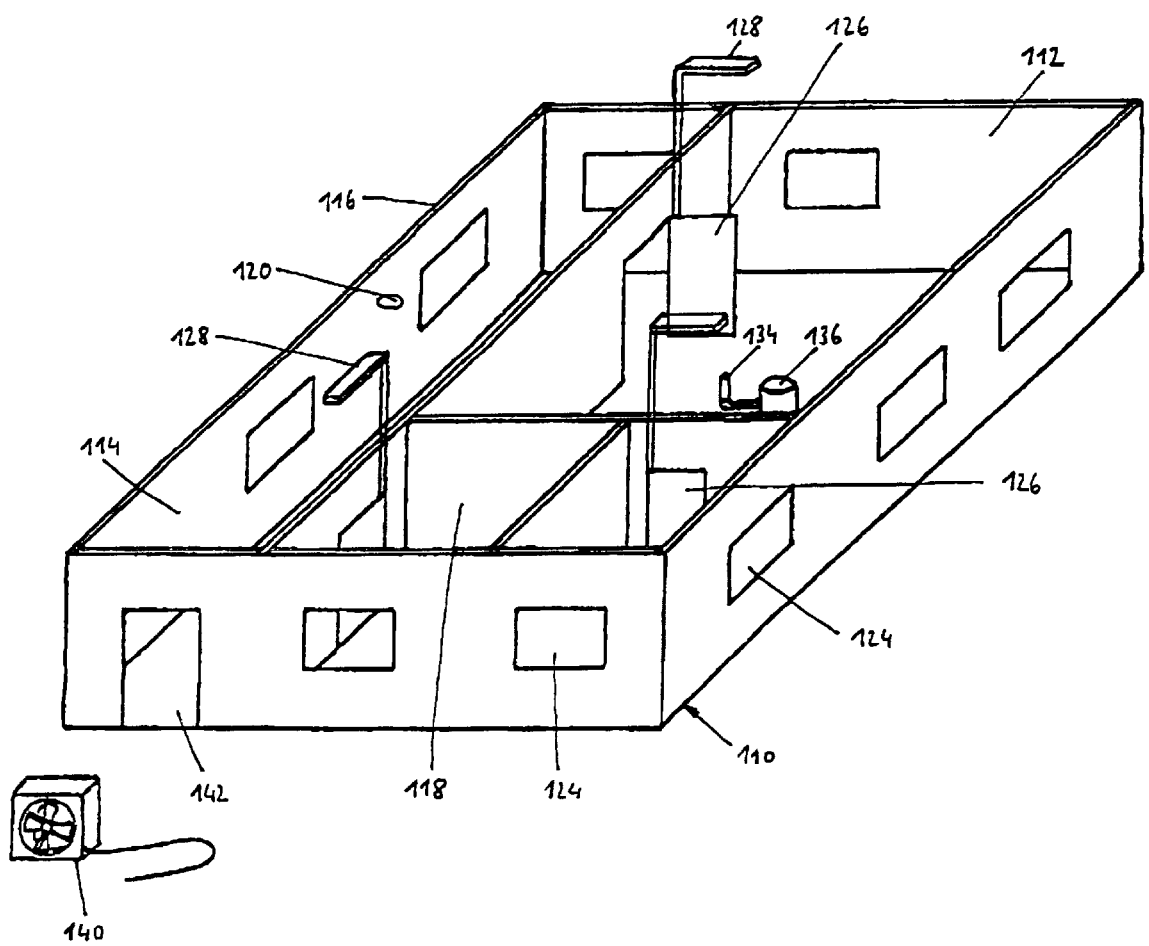
FIG. 3, a plan view of a low building model with chambers arranged next to each other.
Figure 4:
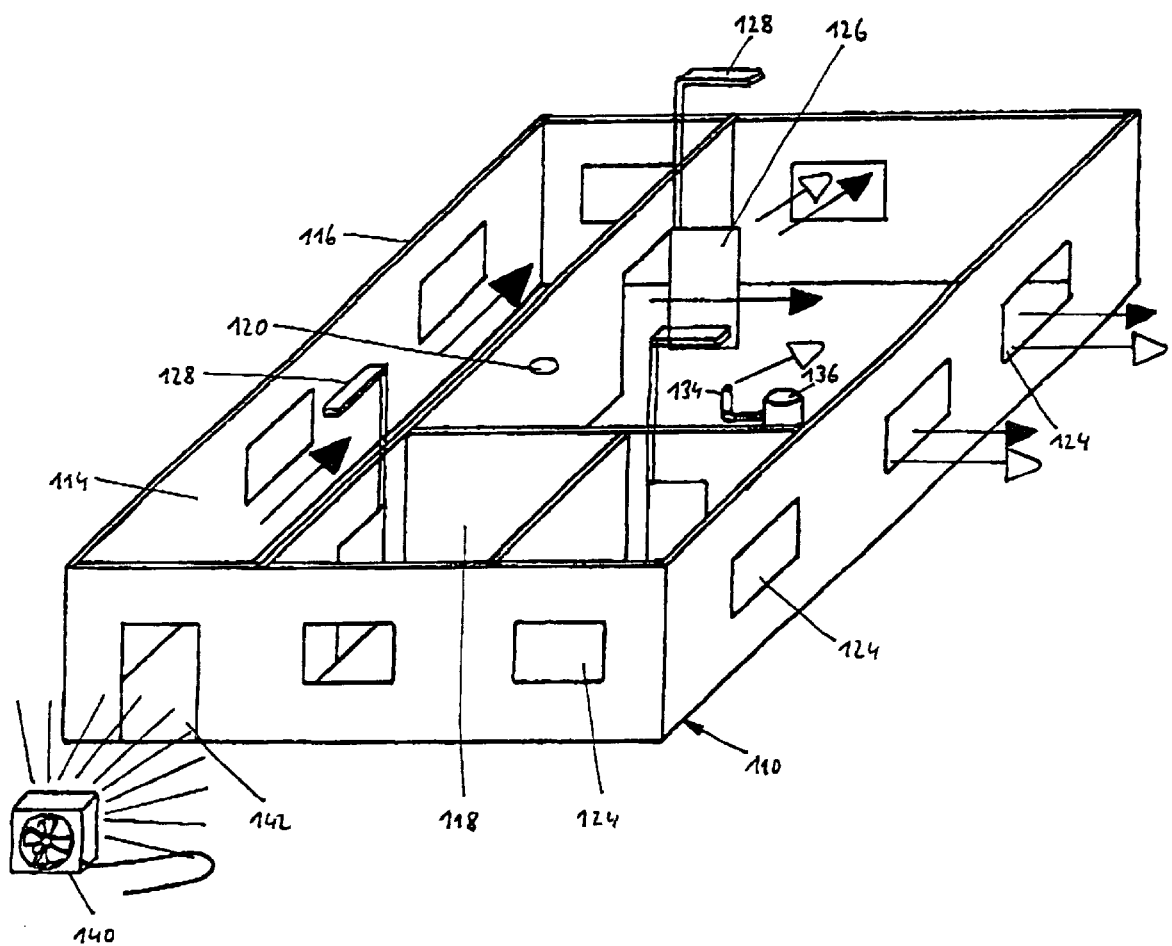
FIG. 4, the building model in FIG. 3 with simulated smoke propagation.

While the vertically extending building model in accordance with FIGS. 1 and 2 is very well suitable for training purposes, because it can be viewed from both sides and therefore makes simultaneous observation possible for many viewers, a building model similar to the building model 110 in accordance with FIGS. 3 and 4 would be provided for researching smoke propagation in low buildings. The building model 110 has several chambers 112, which represent the rooms in a low building, and a central chamber 114, which corresponds to a corridor, from which the rooms of a building are accessible. The exterior walls 116 and the interior walls 118 are made of plywood or other suitable materials. The building model is provided with a transparent cover plate 120, which permits viewing the interior processes in the model. The chambers 112, 114 have closeable window openings 124, and doors 126, which can be closed from the outside, are provided between at least a part of the chambers.

A steam generator 134 with a reservoir 136 is provided in a chamber. The current supply of the building model 110 takes place by means of a transformer (not represented) in the same way as with the building model 10 represented in FIGS. 1 and 2. A ventilator 140 is arranged in the area of the access opening 142 to the central chamber 114, by means of which either an over- or an underpressure can be generated in the central chamber 114, depending on its orientation.

The smoke propagation in the building model 110 during a simulation is represented in FIG. 4. In this case the connecting door 126 between the central chamber 114 and the chamber 112, in which the smoke generator 134 is located, is open. A window 124 in this chamber is open.

The ventilator 140 generates an air current from the access opening 124 through the open door 126 to the open window 124. In this case it would be possible for the fire department to reach the source of the fire without too great danger from the smoke.

It is conceivable in connection with both building models described to use several ventilators simultaneously, for example for increasing the air currents or to simulate recirculating air currents by means of ventilators, which are placed next to each other and operate in different directions.

What is claimed is:

1. A building model for simulating propagation of smoke in case of fires in buildings, said building model comprising several chambers at least partially connected via closeable doors, one of said chambers comprising a central chamber having an access opening from the outside, at least one steam-fog generator in one of said chambers, and at least one, variably positionable miniature ventilator for generating at least one of pressure differences and air currents in the building model at least one of a lateral side plate and a top cover plate of the building model being transparent, and at least a portion of the chambers having closeable windows.

2. The building model in accordance with claim 1, comprising a low building said central chamber representing a corridor and having the other chambers arranged around said central chamber.

3. The building model in accordance with claim 2, further comprising a ventilation flap in the top cover plate in at least one chamber.

4. The building model in accordance with claim 1, wherein the central chamber represents a model of a staircase, and the chambers are arranged on several floors.

5. The building model in accordance with claim 1, further comprising heat sources arranged in the vicinity of the fog or steam generators.

6. The building model in accordance with claim 5, wherein the heat sources comprise one of electric heating installations and tea lights.

7. The building model in accordance with claim 6, further comprising guide elements above the heat sources for definite deflection of warm air current.

8. The building model in accordance with claim 4, wherein said at least one positionable miniature ventilator is arranged in the staircase for simulating a rising current.

9. The building model in accordance with claim 1, wherein the windows and doors are actuatable from a location outside the building.

10. The building model in accordance with claim 1, wherein the windows comprise an easily destroyable foil.

11. The building model in accordance with claim 1, wherein said at least one positionable miniature ventilator is arranged at the access opening of the central chamber of the building model.

12. The building model in accordance with claim 11, wherein the ventilator at the access opening is reversible and includes an aspirating tube on its suction side.

* * * * *